United States Patent Office 3,711,315
Patented Jan. 16, 1973

3,711,315
SACRIFICIAL CORROSION-RESISTANT
DIFFUSION COATINGS
Harry Brill-Edwards, San Antonio, Tex., assignor to
Chromalloy American Corporation, West Nyack, N.Y.
No Drawing. Original application May 31, 1968, Ser. No.
733,286, now Patent No. 3,627,503, dated Dec. 14,
1971. Divided and this application Oct. 8, 1970, Ser.
No. 79,325
Int. Cl. C23c 9/00; B44d 1/16
U.S. Cl. 117—71 M                                           2 Claims

ABSTRACT OF THE DISCLOSURE

A method is provided herewith for the production of sacrificial aluminum-containing diffusion coatings for the cathodic protection of ferrous metal articles against corrosion, particularly in highly saline atmospheres, in which coating an additional metal (such as manganese) is included to combine with the aluminum therein to form an intermetallic compound which is sufficiently anodic with respect to the substrate and/or intermetallic aluminum compounds therein to provide the desired sacrificial or cathodic protection.

CROSS REFERENCE TO A RELATED APPLICATION

This is a division of application Ser. No. 733,286, filed May 31, 1968 now Pat. No. 3,627,503, dated Dec. 14, 1971.

BACKGROUND OF THE INVENTION

This invention relates to the protection of ferrous metal articles from corrosion in highly saline and/or marine atmospheres and, more particularly, to aluminum-base diffusion coatings which also provide a substantial degree of sacrificial or cathodic protection and can be applied at relatively low coating temperatures.

As purely illustrative of certain applications to which this invention is particularly related, and the problems incident thereto, one may note the circumstances and environments in connection with the operation of certain components of jet aircraft engines in highly saline atmospheres (such as low-flying aircraft, particularly helicopters, adjacent seaports and seacoasts). Whereas the anti-corrosion problems of turbine components (as compared to compressor components) of such jet aircraft engines subjected primarily to only the impingement of extremely high temperature combustion gases may relate so much to oxidation resistance at such high temperatures that other possible sources of corrosion become insignificant, the compressor components of such jet-engines experience quite different problems. For example, the compressor components, while rarely subjected to operating temperatures above 900° F., are subjected to direct impingement of highly saline atmospheres at the air intake, which may also include substantial amounts of abrasive particulate material. Additionally, such compressor components are subjected to tremendous mechanical stresses from centrifugal forces, thermal shock, vibration, etc., and under circumstances (particularly with single engine aircraft) where premature failure of the compressor parts for whatever reason may be catastrophic, regardless of the fact that the greater problem of extremely high temperature oxidation resistance of the hot turbine components may have otherwise been solved.

Thus, if the particular materials of which such engine components are made (such as high strength ferrous alloys like those designated in the Aero Space Material Specifications of the Society of Automotive Engineers as AMS 5508, AMS 5616, AMS 6304, etc.) are utilized for their mechanical strength in the compressor, they may have inadequate saline resistance or erosion resistance without some protective surface treatment, and to an extent which cannot assure a useful and failure-free life comparable to that of the high temperature refractory metals or super-alloys utilized in the hot turbine components of the same jet engines.

But jet engine compressor components must function and maintain their functioning within very low tolerances and clearances which do not admit of a substantial build-up of corrosion products (rust, pulverous oxides, etc.) and even miniscule pitting from saline corrosion (characteristic of virtually all (stainless steel parts subjected to saline atmospheres) may reduce the mechanical strength factor many-fold and to an extent which is inimical to adequate performance in such highly stressed parts as compressor blades, compressor rotors, and, particularly, the junctures therebetween subjected to great centrifugal and other vibrational and mechanical forces in a rotating manner and at speeds which cannot tolerate substantial radial imbalances. Furthermore, particularly with such high strength materials, a loss of mechanical properties may occur if the metal articles or engine components are subjected to post-fabrication temperatures substantially above 1000° F. (i.e., in a range where many if not most diffusion coating treatments occur) so it is desirable to provide whatever protective coating is used so that it may be applied at coating or treating temperatures not substantially above 1000° F.

It is proposed (in co-pending application U.S. Ser. No. 733,303 filed of even date herewith, now U.S. Pat. No. 3,642,457) to provide multi component diffusion coatings for corrosion protection in highly saline and erosive atmospheres of such composition that, as the thickness of the coating is gradually eroded away (as by sand or coral dust in the atmosphere), the sacrificial or cathodic protective characteristic of the coating increases. Considering, for example, the blades of a jet engine compressor directly subjected to any erosive particles in the atmosphere, such coatings are extremely useful. Considering, on the other hand, the disc or rotor portion of the same compressor, perhaps not directly subjected to impingement of particles in the atmosphere but still subjected to the saline corrosion, the extra advantage of such coatings may not be required for satisfactory results.

It is also proposed (in co-pending application U.S. Pat. No. 3,589,935, filed of even date herewith) to provide aluminum-base diffusion coatings on such ferrous metal substrates as noted above at coating temperatures no higher than 1000° F. so as to avoid undesiraed crystallographic or metallurgical changes in the substrate during coating, which might have an adverse or undesired effect on the mechanical properties of the parts. Although such coatings provide advantageous oxidation and erosion resistance and minimize the production of pulverous corrosion products, etc., a substantial portion of the protective aluminum in the finished coating apparently tends to combine with iron in the substrate to form an intermetallic compound such as $FeAl_3$, which itself is not sufficiently anodic with respect to some iron alloy substrates to offer the desired sacrificial or cathodic protection thereof against saline corrosion, despite the fact that aluminum alone may be considered as sufficiently anodic to offer cathodic protection of iron.

SUMMARY OF THE INVENTION

In accordance with this invention, by contrast, there is provided a diffusion coating for ferrous metal articles, applied thereto by a pack cementation process in which the article to be coated is embedded in a powdered pack of coating material and heater therein, and the coating is basically aluminum for corrosion protection, but also includes manganese for chemical combination with the aluminum in the coating as diffused into the surface of the substrate ferrous base material to provide an aluminum-manganese compound or component at the surface of the coating which is sufficiently anodic with respect to the ferrous substrate to give sacrificial or cathodic protection of the substrate against chemical corrosion thereof in saline atmospheres. As a further feature of this invention, the aluminum and manganese materials are satisfactorily diffusion coated onto the ferrous substrate at coating or treating temperatures lower than those at which undesired crystallographic or metallurgical changes will occur in the metal articles being coated, and, by the diffusion coating technique, the coating is integrated with the article being coated to provide segregated but metallurgically unified areas for accomplishing the desired corrosion protection and yet so integrated with the substrate as to avoid or minimize separation of the coating despite aggravated thermal shock and mechanical stresses to which the coated article may be subjected in use.

With the foregoing and additional objects in view, this invention will now be described in more detail, and other objects and advantages will be apparent from the following description and the appended claims.

DESCRIPTION OF THE PREFERRED EMBODIMENTS

Although the corrosion protection accorded ferrous metal articles by diffusion coating with aluminum (by a variety of known "aluminizing" processes) is well known in this art, particularly if a satisfactory coating can be obtained at coating temperatures low enough not to interfere with the desired crystallographic or metallurgical properties desired in the ferrous substrate (as is achievable by one of the co-pending applications noted above), the end result in the coating stratum of such processes is apparently the formation of an iron-aluminum intermetallic compound such as $FeAl_3$. As will be understood, considering electrochemical corrosion of generally ferrous substrates in saline atmospheres, such iron aluminide may not be sufficiently anodic with respect to the ferrous substrate to give significant or substantial sacrificial or cathodic protection to the substrate, especially regarding minute pinholes which may inevitably appear or be expected as a result of even a thorough diffusion coating process and despite the fact that aluminum itself might be considered sufficiently anodic to give cathodic protection.

Even if the predominantly aluminum diffusion coating is tempered with a significant component of zinc (as in the above noted co-pending applications) to increase the possibility of sacrificial protection afforded thereby, still the resulting diffused surface layer may not be sufficiently anodic with respect to the ferrous substrate to provide the desired additional advantage of cathodic protection, and, especially, if the substrate is one of the so-called "stainless" ferrous alloys including a substantial proportion of chromium which, as well understood, increases the electrode potential of the substrate requiring yet a greater electrode potential of a coated surface material to achieve cathodic protection thereof.

A variety of metals may be available as additive components for combining with a predominantly aluminum diffusion coating to achieve the sacrificial protection desired here against saline corrosion, yet other considerations from the practical standpoint indicate that certain of such available materials are not preferred. Magnesium, for example, would produce satisfactory results from the standpoint of sacrificial protection, but the characteristics of that material are such as to present tremendous practical difficulties in providing a diffusion coating at temperatures as high as are indicated for producing an aluminum diffusion coating.

As a practical matter, and for primarily economic considerations in circumstances where the ultimate diffusion coating is desired to be produced at temperatures not substantially above 1000° F., a preferred additive component to the coating in accordance herewith for increasing the extent of sacrificial or cathodic protection of aluminum is manganese, especially considering direct pack cementation coating of the ferrous metal base articles as embedded in a powdered coating pack in which deposition of the coating material is aided by the presence of a vaporizable halogen material, although other specific coating metals will come to mind to men skilled in this art, especially in combination with coating materials other than aluminum, all still to be comprehended wtihin the disclosure hereof.

Merely as illustrative of compositions and techniques embodying and for practising this invention, it may be noted that satisfactory results have been achieved by the diffusion coating of a combination of aluminum and manganese into the surface of ferrous metal articles such as fabricated from the above noted AMS 6304 steel to achieve corrosion protection, the enhanced results of which are believed to be attributable to sacrificial or cathodic protection, by providing a two-stage pack cementation diffusion coating of the manganese and aluminum components into the surface of the ferrous metal substrate. In this manner, the surface of the coated article apparently comprises predominantly the intermetallic compound $MnAl_6$, while a sub-surface layer adjacent the coating - substrate interface comprises predominately $FeAl_3$ diffusion bonded to both the $MnAl_6$ layer and the substrate. Although the manganese aluminide exhibits approximately the same electrode potential in a saline atmosphere as pure aluminum, it is substantially more anodic than the iron aluminide generally formed with aluminized coatings on ferrous substrates, and, thus, affords a desired or satisfactory extent of cathodic or sacrificial protection, as well as being harder.

For example, the diffusion coating comprising aluminum and zinc (as produced from the second of the above noted copending applications) on AMS 6304 steel shows an electrode potential of only 0.56 volt when measured by immersing in a sodium chloride solution, which potential (presumably of the $FeAl_3$ surface layer) is not sufficient to give the desired extent of cathodic protection; whereas a coating in accordance herewith in which the surface layer is predominantly manganese aluminide develops an electrode potential under the same testing conditions of as much as 0.85 volt, thereby being sufficient to protect the ferrous substrate cathodically.

Satisfactory results have been achieved in accordance herewith with such multi-component aluminized pack cementation coatings by two-stage coating applications in which the second element (manganese) was diffusion coated first into the ferrous substrate, and with the aluminum component diffused in a second stage to penetrate through the first stage coating and into the surface of the substrate. As a practical matter. it has been found, in accordance herewith, that the appropriate highly sacrificial aluminum intermetallic is not readily formed on the surface of the coating as desired if aluminum is diffused first into the substrate or if both are co-deposited because of the ready diffusability of aluminum, and that preferred results are achieved by diffusion coating the secondary metal first, and then diffusing the aluminum into the thus coated surface. The foregoing, also, indicates that a further consideration in the particular selection of the secondary coating element is not only the galvanic potential thereof when combined with aluminum, but also the diffusabiltiy and solubility thereof with the ferrous substrate to achieve the initial stage of coating.

More specifically, and as merely illustrative of particular operating conditions with which satisfactory results have been achieved in accordance herewith, manganese was deposited and diffusion coated into a ferrous substrate of AMS 6304 base metal articles by embedding the latter in a powdered pack comprising, by weight, about 30% powdered manganese, 0.5% ammonium iodide as a vaporizable halogen energizer, and 70% powdered alumina as an inert filler, according to pack cementation diffusion coating techniques well understood in this art. The ferrous metal articles thus embedded in the foregoing pack and enclosed in a retort were heated in the absence of oxygen for 20 to 30 hours at about 1100° F. during which step manganese was transferred into solid solution into the surface of the ferrous metal article substrate.

Thereafter, in a second coating step, aluminum was diffusion coated over and through the manganese coating by embedding the manganese-coated articles in a diffusion coating pack comprising, by weight, about 20% powdered aluminum, 0.5% ammonium iodide, 1% powdered cadmium, and the balance powdered alumina as a filler, with the coating treatment occurring by heating in a closed retort in the absence of oxygen during about a 30-hour cycle at about 900° F. In such second step, the aluminum diffused rapidly from the pack through the manganese-iron solid solution and dissolved in the iron substrate forming the expected $FeAl_3$ intermetallic, while also displacing manganese previously dissolved toward the surface to form the desired $MnAl_6$ intermetallic compound at the surface of the coating to provide the desired sacrificial or cathodic protection.

Microprobe analyses of the thus coated articles indicated that, although a very small amount of iron in solid solution occurred at the coated surface of the article, the manganese aluminide intermetallic predominated in that area and provided the desired cathodic protection. Such microprobe analyses also indicated that the manganese aluminide phase constituted about one third of the total coating thickness (which constituted about 2 mils), the remainder of which analyzed primarily to be aluminum and iron in a weight ratio indicative of the $FeAl_3$ aluminide.

Corrosion testing in an intense salt spray environment of AMS 6304 articles coated in accordance with the foregoing satisfactorily indicated that this multi-component coating affords increased corrosion protection on such ferrous alloys superior to that afforded by conventional aluminum coatings (even when reinforced with a zinc component as disclosed in the foregoing co-pending applications) and that the time at which the first formation of red rust appeared was substantially reduced, as was the susceptibility of the substrate to corrosion pitting.

As will be apparent from the foregoing, there are provided in accordance herewith techniques and compositions for achieving on ferrous substrate base metal articles at relatively low coating temperatures corrosion-resistant and protective coatings, particularly adapted for corrosion protection in highly saline atmospheres, utilizing the basic protective effects of aluminized diffusion coatings while also including an additional component for increasing the extent of sacrificial or cathodic protection in such saline atmospheres above that which would be otherwise achieved by aluminum coatings even when reinforced with zinc or other similar components. Furthermore, such coatings are readily applied (whether the added component is manganese or some other metal) at treating temperatures not substantially above 1000° F. in order to avoid deterioration of mechanical properties of the substrate material which might occur through crystallographic or metallurgical changes if the base metal article were subjected to post-fabrication coating or treating temperatures in the range of 1500° F. or higher, and such coatings are applied by simple and well understood pack cementation processes for the diffusion deposition of each of the various coating materials merely by heating the ferrous metal articles embedded in a powdered coating pack enclosed in a retort and including the particular metal to be coated, a readily vaporizable halogen energizing component, and inert filler, all in known and well understood manner regarding pack cementation coating techniques.

While the methods and compositions set forth above form preferred embodiments of this invention, this invention is not limited to these precise methods and compositions, and changes may be made therein without departing from the scope of this invention which is defined in the appended claims.

What is claimed is:

1. A method for providing a multicomponent surface diffusion coating on a ferrous metal article to improve the resistance thereof to corrosion by saline environments which comprises, coating said article with a surface layer of manganese as a first coating metal by embedding said article in a powdered diffusion coating cementation pack containing manganese and heating said embedded article to produce a diffusion coating thereon which is not sufficiently electrochemically anodic with respect to said ferrous article but which provides cathodic protection thereof against saline corrosion, thereafter coating the manganese-coated article with a second coating metal of aluminum by heating said manganese-coated article while embedded in a powdered diffusion coating cementation pack containing aluminum to effect diffusion of aluminum into and through said manganese layer and form said multicomponent diffusion coating comprising an intermetallic compound of iron aluminide and an intermetallic compound of manganese aluminide which is substantially more anodic than said article for providing cathodic protection thereof,
   with a preponderant concentration of iron aluminide substantially as $FeAl_3$ adjacent the article-multicomponent interface and a preponderant amount of manganese aluminide substantially as $MnAl_6$ adjacent the outer surface of said multicomponent coating and maintaining and heating in said aluminum-containing pack until said multicomponent coating and said article are metallurgically integrated and bonded together.

2. A method as recited in claim 1 in which both said diffusion coating steps are conducted at temperatures not substantially above 1000° F.

References Cited

UNITED STATES PATENTS

| | | | |
|---|---|---|---|
| 3,293,068 | 12/1966 | Bradley et al. | 117—107.2 P |
| 3,167,403 | 1/1965 | Smith et al. | 29—196.2 |
| 3,061,463 | 10/1962 | Samuel | 117—107.2 P |

ALFRED L. LEAVITT, Primary Examiner

C. K. WEIFFENBACH, Assistant Examiner

U.S. Cl. X.R.

29—196.2, 198; 117—107.2 P